United States Patent
Beregovaya et al.

(10) Patent No.: US 12,307,216 B1
(45) Date of Patent: May 20, 2025

(54) LINGUISTIC CONTENT EVALUATIONS TO PREDICT PERFORMANCES IN LINGUISTIC TRANSLATION WORKFLOW PROCESSES BASED ON NATURAL LANGUAGE PROCESSING

(71) Applicant: Welocalize, Inc., New York, NY (US)

(72) Inventors: Olga Beregovaya, New York, NY (US); Jon Cambra Guinea, New York, NY (US); David Clarke, New York, NY (US); Alex Killen, New York, NY (US); Nileshkumar Rawal, New York, NY (US); Boris Strepacki, New York, NY (US); Kevin Tong, New York, NY (US); Alex Yanishevsky, New York, NY (US)

(73) Assignee: Welocalize, Inc., New York, NY (US)

( * ) Notice: Subject to any disclaimer, the term of this patent is extended or adjusted under 35 U.S.C. 154(b) by 0 days.

(21) Appl. No.: 18/870,525

(22) PCT Filed: Jun. 29, 2023

(86) PCT No.: PCT/US2023/026553
§ 371 (c)(1),
(2) Date: Nov. 29, 2024

(87) PCT Pub. No.: WO2024/010731
PCT Pub. Date: Jan. 11, 2024

Related U.S. Application Data

(60) Provisional application No. 63/358,440, filed on Jul. 5, 2022.

(51) Int. Cl.
*G06F 17/00* (2019.01)
*G06F 40/10* (2020.01)
*G06F 40/58* (2020.01)

(52) U.S. Cl.
CPC .............. *G06F 40/58* (2020.01); *G06F 40/10* (2020.01)

(58) Field of Classification Search
CPC ................. G06F 40/58; G06F 40/10
See application file for complete search history.

(56) References Cited

U.S. PATENT DOCUMENTS

| | | |
|---|---|---|
| 6,301,554 B1 | 10/2001 | Christy |
| 8,140,322 B2 | 3/2012 | Simonsen |

(Continued)

FOREIGN PATENT DOCUMENTS

| | | | | |
|---|---|---|---|---|
| CN | 108287820 A | * | 7/2018 | ............ G06F 40/211 |
| CN | 114372481 A | * | 4/2022 | |

(Continued)

OTHER PUBLICATIONS

Hommel, Bjorn E. et al, "Transformer-Based Deep Neural Language Modeling for Construct-Specific Automatic Item Generation", psychometrika—vol. 87, No. 2, 749-772, Jun. 2022, https://doi.org/10.1007/s11336-021-09823-9 (Year: 2022).*

(Continued)

*Primary Examiner* — Laurie A Ries
(74) *Attorney, Agent, or Firm* — Dentons US LLP

(57) ABSTRACT

Logic to drive workflow for various pivot points at various stages of workflow dispatch, translation, and quality assurance within various modern service delivery and translation management platforms to expedite speed of translation workflow process and improve quality of final translation product, while increasing computational efficiency and decreasing network latency. The logic profiles a source content recited in a source language, routes the source content among translation workflow processes within the logic to be translated from the source language to a target language based on such source profiling and satisfaction/

(Continued)

non-satisfaction of corresponding thresholds to form a target content recited in the target language, profiles the target content recited in the target language, and performs a targeted process on the target content recited in the target language by corresponding routing of the target content among translation workflow processes within the logic if warranted based on such target profiling and satisfaction/non-satisfaction of corresponding thresholds.

26 Claims, 6 Drawing Sheets

(56) References Cited

U.S. PATENT DOCUMENTS

| | | | |
|---|---|---|---|
| 8,145,472 B2 | 3/2012 | Shore | |
| 8,566,078 B2 | 10/2013 | Sarikaya | |
| 9,639,528 B1 | 5/2017 | Hoffmann | |
| 10,025,776 B1 | 7/2018 | Sjoberg | |
| 10,248,653 B2 | 4/2019 | Blassin | |
| 10,409,917 B1* | 9/2019 | Fuerstenau | G06F 40/58 |
| 10,599,767 B1* | 3/2020 | Mattera | G06F 40/242 |
| 11,068,669 B2* | 7/2021 | Malcangio | G06F 9/454 |
| 11,126,799 B2 | 9/2021 | Brandall | |
| 11,468,315 B2* | 10/2022 | Turner | G06N 3/08 |
| 11,775,762 B1* | 10/2023 | Mason | G06F 16/3347 704/9 |
| 2013/0024184 A1* | 1/2013 | Vogel | G06F 40/58 704/9 |
| 2014/0019113 A1* | 1/2014 | Wu | G06F 40/242 704/2 |
| 2015/0199339 A1* | 7/2015 | Mirkin | G06F 16/3337 704/2 |
| 2016/0162478 A1 | 6/2016 | Blassin | |
| 2016/0358102 A1 | 12/2016 | Bowers | |
| 2017/0060855 A1* | 3/2017 | Song | G06F 40/55 |
| 2017/0212890 A1* | 7/2017 | Akbik | G06F 40/30 |
| 2017/0262434 A1 | 9/2017 | Sumita | |
| 2017/0269971 A1 | 9/2017 | Anya | |
| 2017/0286398 A1 | 10/2017 | Hunt | |
| 2018/0143975 A1* | 5/2018 | Casal | G06F 40/51 |
| 2020/0334416 A1* | 10/2020 | Vianu | G06V 10/764 |
| 2021/0319189 A1* | 10/2021 | Trehan | G10L 15/1815 |
| 2022/0171966 A1* | 6/2022 | Nakazawa | G06V 30/19 |

FOREIGN PATENT DOCUMENTS

| | | | | |
|---|---|---|---|---|
| CN | 111859994 B * | 1/2024 | | G06F 40/289 |
| JP | 2017097882 | 6/2017 | | |
| KR | 20190060227 | 6/2019 | | |
| WO | WO-2019070634 A1 * | 4/2019 | | G06F 40/10 |
| WO | WO2020068858 | 4/2020 | | |
| WO | WO-2020086458 A1 * | 4/2020 | | H04L 41/145 |

OTHER PUBLICATIONS

Troxler, Andreas, et al, "Actuarial applications of natural language processing using transformers: Case studies for using text features in an actuarial context", British Actuarial Journal (2024), vol. 29, e4, pp. 1-37, doi:10.1017/S1357321724000023. (Year: 2024).*

Barzegar, Siamak, et al, "DINFRA: A One Stop Shop for Computing Multilingual Semantic Relatedness", ARXIV ID: 1805.09644, DOI: 10.1145/2766462.2767870, May 16, 2018, pp. 1-2. (Year: 2018).*

Grasaas, Erik, et al, "ICanCope With Pain: Cultural Adaptation and Usability Testing of a Self-Management App for Adolescents With Persistent Pain in Norway", JMIR Research Protocols, ISSN: 1929-0748, Jun. 3, 2019, pp. 1-14. (Year: 2019).*

Xu, Colin, "Applications of Advanced Statistical Modeling Techniques for Understanding Depression", University of Pennsylvania, ProQuest Dissertations & Theses, 2022. 29259586, pp. 1-265. (Year: 2022).*

International Search Report and Written Opinion dated Sep. 29, 2023 in related PCT Application PCT/US23/26553 filed Jun. 29, 2023 (5 pages).

Welocalize, Bad to the Bone: AI-Enabled Smart LQA, MT Summit 2021, downloaded from Internet Nov. 27, 2024, https://amtaweb.org/wp-content/uploads/2021/10/2021.mtsummit-up.pdf (pp. 175-206).

Welocalize, Using AI to Protect Your Global Brand: Tackling Non-Inclusive and Hate Speech dated Jun. 26, 2022, downloaded from Wayback Machine Nov. 27, 2024, https://www.welocalize.com/using-ai-to-protect-your-global-brand/ (5 pages).

* cited by examiner

| Metrics | Definition | Threshold |
|---|---|---|
| ADJ Count | Number of adjective phrases within a segment | 3 |
| NOUN Count | Number of noun phrases within a segment. NOUN3 indicates noun phrase consisting of three nouns | 5 |
| PROPN Count | Number of proper noun phrases within a segment | 2 |
| Word Count | Unique words in a segment | 25 |
| Long Word Count | A word with 9 characters or more | 9 |
| Complex Word Count | A word with 2 syllables or more | 7 |
| Nominalization Count | Nominalization is the use of a word which is not a noun as a noun. For instance, investigation (from investigate) or swimming (from swim) | 1 |
| Sentence Count | Number of sentences in a segment | 1 |
| LM Score | Language model score. Lower score is better | 200 |
| FleschReadingEase | Readability formula. Reference here | 60 |

| Text | ADJ | ADJ Count | ADJ Count NOUN | NOUN Coun NOUN Coun Word Coun Word Coun Sentence (PassiReat RecchReat Segment S File Status File Comment |  |  |  |  |  |  |  |  |
|---|---|---|---|---|---|---|---|---|---|---|---|---|
| wlopez@apple.com,k | | 0 PASS | | 1 PASS | | wlopez | | 4 PASS | | 12.425 FAIL | PASS | |
| GSX users |Returnable | | 1 PASS | | 12 FAIL | | users \| ser | | 30 FAIL | | 20.745 FAIL | FAIL | |
| | | | | | | | | | | | PASS | This File has status "PASSED". |

LINGUISTIC CONTENT EVALUATIONS TO PREDICT PERFORMANCES IN LINGUISTIC TRANSLATION WORKFLOW PROCESSES BASED ON NATURAL LANGUAGE PROCESSING

CROSS-REFERENCE TO RELATED PATENT APPLICATIONS

This patent application claims a benefit of priority to PCT International Application PCT/US2023/026553 filed 29 Jun. 2023; which claims a benefit of priority to U.S. provisional patent application 63/358,440 filed 5 Jul. 2022; each of which is incorporated by reference herein in its entirety for all purposes.

TECHNICAL FIELD

This disclosure relates to computational linguistics.

BACKGROUND

For language service providers, there is currently no known recommendation engine (or other forms of executable logic) to drive workflow for various technology-driven decision-making pivot points at various stages of workflow dispatch, translation, and quality assurance within various modern service delivery and translation management platforms to expedite speed of translation workflow process and improve quality of final translation product, while also increasing computational efficiency and decreasing network latency. This may be so at least because content transformation decisions are made manually by a human actor. For example, some content type analysis may be performed by human evaluators using manual process (e.g., based on spreadsheets), thereby driving workforce selection matched to content type decisions (e.g., by skillset, specialization, years of experience). Likewise, various workflow routing decisions may be following similar human content evaluation processes (e.g., use of machine translation, machine translation post-editing, full human translation, transcreation). Similarly, to determine a scope of a linguistic quality assurance (LQA) process, i.e., how much content is to be sampled within the LQA process, random content selection or oversampling is currently employed because there is currently no known algorithmic content selection methodology based on content linguistic features. Additionally, such form of random content selection or oversampling exists because there is currently no known approach of building and training machine learning frameworks based on "gold standard" data for specific content types, which would allow to identify "outliers" that may potentially pose quality risk and should be subject of the LQA process, as opposed to random content sampling. Resultantly, this state of being does not allow any form of visual presentation informative of a performed linguistic feature analysis, a corresponding workflow recommendation, and a corresponding recommendation on the scope of the LQA process performed, especially with an ability to drill down into this visual presentation.

SUMMARY

This disclosure solves various technological problems described above by enabling various recommendation engines (or other forms of executable logic) to drive workflow for various technology-driven decision-making pivot points at various stages of workflow dispatch, translation, and quality assurance within various modern service delivery and translation management platforms to expedite speed of translation workflow process and improve quality of final translation product, while also increasing computational efficiency and decreasing network latency. This occurs by the recommendation engines (or other forms of executable logic) (1) profiling a source content (e.g., a descriptive text, an unstructured text) recited in a source language (e.g., Russian) based on various natural language processing (NLP) techniques, (2) routing the source content among translation workflow processes (e.g., machine translation with manual post-edits if necessary or manual translation) within the recommendation engines (or other forms of executable logic) to be translated from the source language to a target language (e.g., English) based on such source profiling and satisfaction or non-satisfaction of corresponding thresholds to form a target content (e.g., a descriptive text, an unstructured text) recited in the target language, (3) profiling the target content recited in the target language based on various NLP techniques, and (4) performing a targeted LQA process on the target content recited in the target language by corresponding routing of the target content among translation workflow processes within the recommendation engines (or other forms of executable logic) if warranted based on such target profiling and satisfaction or non-satisfaction of corresponding thresholds, as further explained below.

This unconventional approach is technologically beneficial because various NLP techniques are used as an automated workflow decision-driving mechanism in accurately managing workflows of files (e.g., data files, text files, productivity files) on enterprise scale, including for the targeted LQA process, in contrast to a conventional approach of having various content transformation decisions being made manually by a human actor. Such technological benefits increase computational efficiency, decrease network latency, expedite speed of translations, and improve translation quality, while simultaneously being more cost-effective and less laborious than the conventional approach. For example, when content (e.g., a descriptive text, an unstructured text) is routed for machine translation even though such content is not suited for machine translation, there are significant additional post-editing manual translation efforts, which are time-consuming and laborious, while also being wasteful in computational cycles and network bandwidth. Therefore, the unconventional approach noted above minimizes or eliminates these significant additional post-editing manual translation efforts. Likewise, unlike random content selection or oversampling for the targeted LQA process, the unconventional approach noted above enables or maximizes targeted search for "real" poor quality candidates, which leads to significant reduction of time and labor for the targeted LQA process, while being efficient in computational cycles and network bandwidth. Additionally, this unconventional approach enables a form of visual presentation informative of performed linguistic feature analysis, a corresponding workflow recommendation, and a corresponding recommendation on the scope of the LQA process performed, especially with the ability to drill down into this visual presentation.

In an embodiment, there is a system comprising: a computing instance programmed to: access a source descriptive text recited in a source language; within a predetermined workflow containing a first sub-workflow, a second sub-workflow, a third sub-workflow, and a fourth sub-workflow: form a source workflow decision for the source descriptive text to profile the source descriptive text based on: identifying the source language in the source descriptive text; tokenizing the source descriptive text into a set of source tokens according to the source language that has been identified; tagging each source token selected from the set of source tokens with a part of source speech label according to the source language that has been identified such that a set of part of source speech labels is formed; segmenting each source token selected from the set of source tokens into a set of source syllables according to the source language that has been identified; determining whether the source descriptive text satisfies a source descriptive text threshold for the source language that has been identified, wherein the source descriptive text satisfies the source descriptive text threshold based on a source syntactic feature or a source semantic feature involving (i) the set of source tokens tagged according to the set of part of source speech labels or (ii) the set of source syllables; labeling the source descriptive text with a source pass label based on the source descriptive text threshold being satisfied or a source fail label based on the source descriptive text threshold not being satisfied, wherein the source workflow decision is formed based on the source descriptive text being labeled with the source pass label or the source fail label; route the source descriptive text to the first sub-workflow responsive to the source workflow decision being formed based on the source descriptive text being labeled with the source pass label or the second sub-workflow responsive to the source workflow decision being formed based on the source descriptive text being labeled with the source fail label; form a target workflow decision for the source descriptive text that was translated from the source language that has been identified into a target descriptive text recited in a target language during the first sub-workflow or the second sub-workflow to profile the target descriptive text based on: identifying the target language in the target descriptive text; tokenizing the target descriptive text into a set of target tokens according to the target language that has been identified; tagging each target token selected from the set of target tokens with a part of target speech label according to the target language that has been identified such that a set of part of target speech labels is formed; segmenting each target token selected from the set of target tokens into a set of target syllables according to the target language that has been identified; determining whether the target descriptive text satisfies a target descriptive text threshold for the target language that has been identified, wherein the target descriptive text satisfies the target descriptive text threshold based on a target syntactic feature or a target semantic feature involving (i) the set of target tokens tagged according to the set of part of target speech labels or (ii) the set of target syllables; labeling the target descriptive text with a target pass label based on the target descriptive text threshold being satisfied or a target fail label based on the target descriptive text threshold not being satisfied, wherein the target workflow decision is formed based on the target descriptive text being labeled with the target pass label or the target fail label; and route the target descriptive text to the third sub-workflow responsive to the target workflow decision being formed based on the target descriptive text being labeled with the target pass label or the fourth sub-workflow responsive to the target workflow decision being formed based on the target descriptive text being labeled with the target fail label.

DESCRIPTION OF DRAWINGS

FIG. 5 shows an embodiment of a screen for drill-down data of the dashboard of FIG. 4 according to this disclosure.

FIG. 6 shows an embodiment of a screen for pass/fail data according to this disclosure.

DETAILED DESCRIPTION

Figure 1:
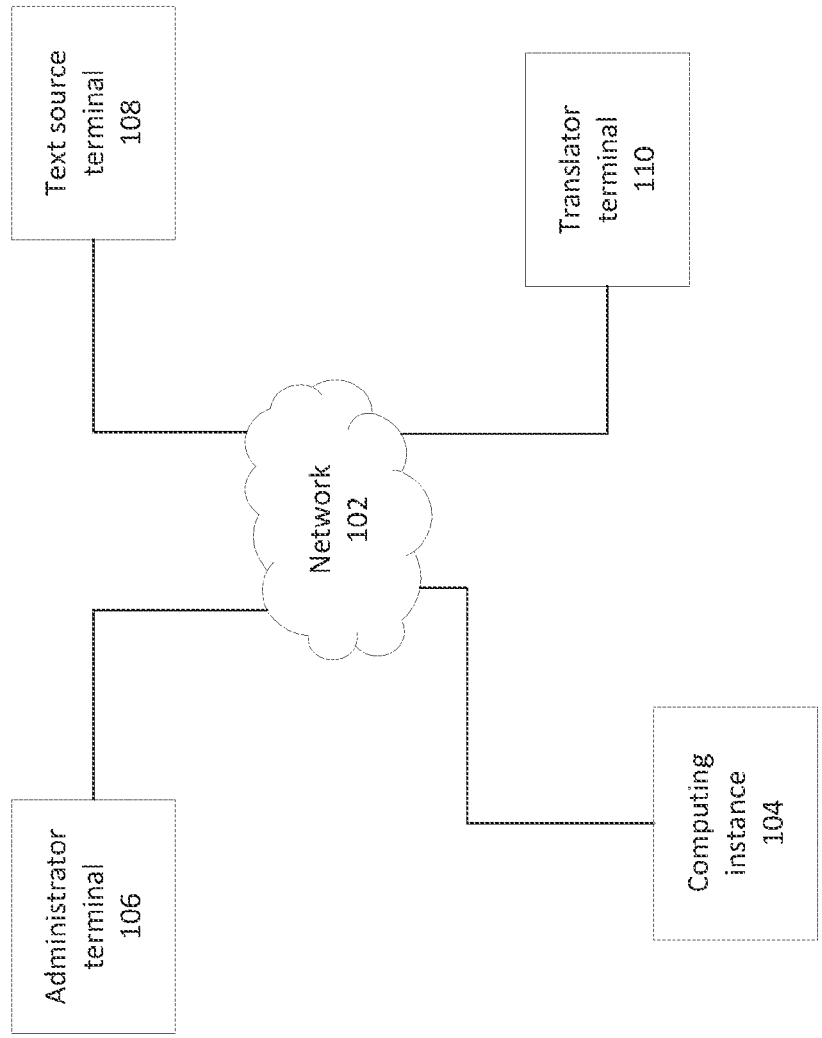
FIG. 1 shows a schematic diagram of an embodiment of a computing architecture for a system to linguistic content evaluations to predict performances in linguistic translation workflow processes based on natural language processing according to this disclosure.

As explained above, this disclosure solves various technological problems described above by enabling various recommendation engines (or other forms of executable logic) to drive workflow for various technology-driven decision-making pivot points at various stages of workflow dispatch, translation, and quality assurance within various modern service delivery and translation management platforms to expedite speed of translation workflow process and improve quality of final translation product, while also increasing computational efficiency and decreasing network latency. This occurs by the recommendation engines (or other forms of executable logic) (1) profiling a source content (e.g., a descriptive text, an unstructured text) recited in a source language (e.g., Russian) based on various NLP techniques. (2) routing the source content among translation workflow processes (e.g., machine translation with manual post-edits if necessary or manual translation) within the recommendation engines (or other forms of executable logic) to be translated from the source language to a target language (e.g., English) based on such source profiling and satisfaction or non-satisfaction of corresponding thresholds to form a target content (e.g., a descriptive text, an unstructured text) recited in the target language, (3) profiling the target content recited in the target language based on various NLP techniques, and (4) performing a targeted LQA process on the target content recited in the target language by corresponding routing of the target content among translation workflow processes within the recommendation engines (or other forms of executable logic) if warranted based on such target profiling and satisfaction or non-satisfaction of corresponding thresholds, as further explained below.

This unconventional approach is technologically beneficial because various NLP techniques are used as an automated workflow decision-driving mechanism in accurately managing workflows of files (e.g., data files, text files, productivity files) on enterprise scale, including for the targeted LQA process, in contrast to a conventional approach of having various content transformation decisions being made manually by a human actor. Such technological benefits increase computational efficiency, decrease network latency, expedite speed of translation workflow process, and improve final translation product quality, while simultaneously being more cost-effective and less laborious than the conventional approach. For example, when content (e.g., a descriptive text, an unstructured text) is routed for machine translation even though such content is not suited for machine translation, there are significant additional post-editing manual translation efforts, which are time-consuming and laborious, while also being wasteful in computational cycles and network bandwidth. Therefore, the unconventional approach noted above minimizes or eliminates these significant additional post-editing manual translation efforts. Likewise, unlike random content selection or oversampling for the targeted LQA process, the unconventional approach noted above enables or maximizes targeted search for "real" poor quality candidates, which leads to significant reduction of time and labor for the targeted LQA process, while being efficient in computational cycles and network bandwidth. Additionally, this unconventional approach enables a form of visual presentation informative of performed linguistic feature analysis, a corresponding workflow recommendation, and a corresponding recommendation on the scope of the LQA process performed, especially with the ability to drill down into this visual presentation.

This disclosure is now described more fully with reference to all attached figures, in which some embodiments of this disclosure are shown. This disclosure may, however, be embodied in many different forms and should not be construed as necessarily being limited to various embodiments disclosed herein. Rather, these embodiments are provided so that this disclosure is thorough and complete, and fully conveys various concepts of this disclosure to skilled artisans. Note that like numbers or similar numbering schemes can refer to like or similar elements throughout.

Various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

As used herein, a term "or" is intended to mean an inclusive "or" rather than an exclusive "or." That is, unless specified otherwise, or clear from context, "X employs A or B" is intended to mean any of natural inclusive permutations. That is, if X employs A; X employs B; or X employs both A and B, then "X employs A or B" is satisfied under any of the foregoing instances. For example, X includes A or B can mean X can include A, X can include B, and X can include A and B, unless specified otherwise or clear from context.

As used herein, each of singular terms "a," "an," and "the" is intended to include a plural form (e.g., two, three, four, five, six, seven, eight, nine, ten, tens, hundreds, thousands, millions) as well, including intermediate whole or decimal forms (e.g., 0.0, 0.00, 0.000), unless context clearly indicates otherwise. Likewise, each of singular terms "a," "an," and "the" shall mean "one or more," even though a phrase "one or more" may also be used herein.

As used herein, each of terms "comprises," "includes," or "comprising," "including" specify a presence of stated features, integers, steps, operations, elements, or components, but do not preclude a presence or addition of one or more other features, integers, steps, operations, elements, components, or groups thereof.

As used herein, when this disclosure states herein that something is "based on" something else, then such statement refers to a basis which may be based on one or more other things as well. In other words, unless expressly indicated otherwise, as used herein "based on" inclusively means "based at least in part on" or "based at least partially on."

As used herein, terms, such as "then," "next," or other similar forms are not intended to limit an order of steps. Rather, these terms are simply used to guide a reader through this disclosure. Although process flow diagrams may describe some operations as a sequential process, many of those operations can be performed in parallel or concurrently. In addition, the order of operations may be rearranged.

As used herein, a term "response" or "responsive" are intended to include a machine-sourced action or inaction, such as an input (e.g., local, remote), or a user-sourced action or inaction, such as an input (e.g., via user input device).

As used herein, a term "about" or "substantially" refers to a +/−10% variation from a nominal value/term.

Although various terms, such as first, second, third, and so forth can be used herein to describe various elements, components, regions, layers, or sections, note that these elements, components, regions, layers, or sections should not necessarily be limited by such terms. Rather, these terms are used to distinguish one element, component, region, layer, or section from another element, component, region, layer, or section. As such, a first element, component, region, layer, or section discussed below could be termed a second element, component, region, layer, or section, without departing from this disclosure.

Unless otherwise defined, all terms (including technical and scientific terms) used herein have a same meaning as commonly understood by skilled artisans to which this disclosure belongs. These terms, such as those defined in commonly used dictionaries, should be interpreted as having a meaning that is consistent with their meaning in context of relevant art and should not be interpreted in an idealized or overly formal sense, unless expressly so defined herein.

Features or functionality described with respect to certain embodiments may be combined and sub-combined in or with various other embodiments. Also, different aspects, components, or elements of embodiments, as disclosed herein, may be combined and sub-combined in a similar manner as well. Further, some embodiments, whether individually or collectively, may be components of a larger system, wherein other procedures may take precedence over or otherwise modify their application. Additionally, a number of steps may be required before, after, or concurrently with embodiments, as disclosed herein. Note that any or all methods or processes, as disclosed herein, can be at least partially performed via at least one entity or actor in any manner.

Hereby, all issued patents, published patent applications, and non-patent publications that are mentioned or referred to in this disclosure are herein incorporated by reference in their entirety for all purposes, to a same extent as if each individual issued patent, published patent application, or non-patent publication were specifically and individually indicated to be incorporated by reference. To be even more clear, all incorporations by reference specifically include those incorporated publications as if those specific publications are copied and pasted herein, as if originally included in this disclosure for all purposes of this disclosure. Therefore, any reference to something being disclosed herein includes all subject matter incorporated by reference, as explained above. However, if any disclosures are incorporated herein by reference and such disclosures conflict in part or in whole with this disclosure, then to an extent of the conflict or broader disclosure or broader definition of terms, this disclosure controls. If such disclosures conflict in part or in whole with one another, then to an extent of conflict, the later-dated disclosure controls.

FIG. 1 shows a schematic diagram of an embodiment of a computing architecture for a system to linguistic content evaluations to predict performances in linguistic translation workflow processes based on natural language processing according to this disclosure. In particular, a computing architecture 100 includes a network 102, a computing instance 104, an administrator terminal 106, a text source terminal 108, and a translator terminal 110.

The network 102 is a wide area network (WAN), a local area network (LAN), a cellular network, a satellite network, or any other suitable network, which can include Internet. Although the network 102 is illustrated as a single network 102, this is not required and the network 102 can be a group or collection of suitable networks collectively operating together in concert to accomplish various functionality as disclosed herein. For example, the group or collection of WANs may form the network 102 to operate as disclosed herein.

The computing instance 104 is a server (e.g., hardware, virtual, application, database) running an operating system (OS) and an application program thereon. The application program is accessible via an administrator user profile, a text source user profile, and a translator user profile, each of which may be stored in the computing instance, whether internal or external to the application program. Although the computing instance 104 is illustrated as a single computing instance 104, this is not required and the computing instance 104 can be a group or collection of suitable servers collectively operating together in concert to accomplish various functionality as disclosed herein. For example, the group or collection of servers may collectively host the application program (e.g., via a distributed on-demand resilient cloud computing instance to enable a cloud-native infrastructure) to operate as disclosed herein.

The administrator terminal 106 is a workstation running an OS and a web browser thereon. The web browser of the administrator terminal 106 interfaces with the application program of the computing instance 104 over the network 102 such that the administrator user profile is operative through the web browser of the administrative terminal 106 for various administrative tasks disclosed herein. The administrator terminal 106 may be a desktop computer, a laptop computer, or other suitable computers. As such, the administrator terminal 106 administers the computing instance 104 via the administrator user profile through the web browser of the administrative terminal 106 over the network 102. For example, the administrator terminal 106 is enabled to administer the computing instance 104 via the administrator user profile through the web browser of the administrative terminal 106 over the network 102 to manage user profiles, workflow dispatches, text translations, LQA processes, file routing, security settings, and other suitable administrative functions.

Although the administrator terminal 106 is illustrated as a single administrator terminal 106, this is not required and the administrator terminal 106 can be a group or collection of administrator terminals 106 operating independent of each other to perform administration of the computing instance 104 over the network 102, which may be in parallel or not in parallel, to accomplish various functionality as disclosed herein. For example, there may be a group or collection of administrator terminals 106 administering the computing instance 104 in parallel via a group or collection of administrator user profiles through the web browsers of the administrative terminals 106 over the network 102 to operate as disclosed herein. Likewise, note that although the administrator terminal 106 is shown as being separate and distinct from the text source terminal 108 and the translator terminal 110, this is not required and the administrator terminal 106 can be common or one with at least one of the text source terminal 108 (e.g., for testing purposes) or the translator terminal 110 (e.g., for testing purposes).

The text source terminal 108 is a workstation running an OS and a web browser thereon. The web browser of the text source terminal 108 interfaces with the application program of the computing instance 104 over the network 102 such that the text source user profile is operative through the web browser of the text source terminal 108 for various descriptive (or unstructured) text tasks disclosed herein. The text source terminal 108 may be a desktop computer, a laptop computer, or other suitable computers. As such, the text source terminal 108 is enabled to input (e.g., upload, select, identify, paste, reference) a source descriptive (or unstructured) text (e.g., an article, an essay, an electronic conversation, a legal document, a patent specification, a contract) recited in a source language (e.g., Spanish) or a copy thereof via the text source user profile through the web browser of the text source terminal 108 over the network 102 to the application program of the computing instance 104 for subsequent translation of the source descriptive (or unstructured) text by the application program of the computing instance 104 from the source language to a target language (e.g., French). The text source terminal 108 is also enabled to receive the source descriptive (or unstructured) text translated into the target language from the application program of the computing instance 104 via the text source user profile through the web browser of the text source terminal 108 over the network 102. Such receipt may be displayed on the text source terminal 108 via the text source user profile through the web browser of the text source terminal 108 or sent (e.g., by email) to the text source terminal 108, whether as a file containing the source descriptive (or unstructured) text translated into the target language from the application program of the computing instance 104 or a link to access (e.g., download) the file containing source descriptive (or unstructured) text translated into the target language from the application program of the computing instance 104 via the text source user profile through the web browser of the text source terminal 108.

Although the text source terminal 108 is illustrated as a single text source terminal 108, this is not required and the text source terminal 108 can be a group or collection of text source terminals 108 operating independent of each other to input, which may be in parallel or not in parallel, various descriptive (or unstructured) texts recited in source languages (e.g., Italian, German) into the application program of the computing instance 104 over the network 102 for the application program of the computing instance 104 to translate, whether in parallel or not in parallel, or enable translation of those descriptive (or unstructured) texts into target languages (e.g., Portuguese, Polish). Likewise, the group or collection of text source terminals 108 may be enabled to receive the source descriptive (or unstructured) texts translated into the target languages from the application program of the computing instance 104 via a group or collection of text source user profiles through the web browsers of the text source terminals 108 over the network 102. For example, there may be a group or collection of text source terminals 108 inputting in parallel the descriptive (or unstructured) texts recited in the source languages into the application program of the computing instance 104 via a group or collection of text source user profiles through the web browsers of the text source terminals 108 over the network 102 to translate or enable translation of the descriptive (or unstructured) texts from the source languages to the target languages. Then, the application program of the computing instance 104 may be outputting in parallel or not in parallel the descriptive (or unstructured) texts translated into the target languages to the group or collection of text source user profiles through the web browsers of the text source terminals 108 over the network 102. Likewise, note that although the text source terminal 108 is shown as being separate and distinct from the administrator terminal 106 and the translator terminal 110, this is not required and the text source terminal 108 can be common or one with at least one of the administrator terminal 106 (e.g., for testing purposes) or the translator terminal 110 (e.g., for testing purposes).

The translator terminal 110 is a workstation running an OS and a web browser thereon. The web browser of the translator terminal 110 interfaces with the application program of the computing instance 104 over the network 102 such that the translator user profile is operative through the web browser of the translator terminal 110 for various translation tasks disclosed herein. The translator terminal 110 may be a desktop computer, a laptop computer, or other suitable computers. As such, the translator terminal 110 is enabled to access the application program of the computing instance 104 via the translator user profile through the web browser of the translator terminal 110 over the network 102 and then input or edit the source descriptive (or unstructured) text in the target language in the application program of the computing instance 104 over the network 102 if necessary for the targeted LQA disclosed herein, after the source descriptive (or unstructured) text has been input into the application program of the computing instance 104 via the text source terminal 108 as disclosed herein. The application program of the computing instance 104 saves such inputs or edits from the translator user profile through the web browser of the translator terminal 110 to the source descriptive (or unstructured) text in the target language to subsequently avail the source descriptive (or unstructured) text in the target language to the text source terminal 108, as input or edited via the translator user profile through the web browser of the translator terminal 110.

Although the translator terminal 110 is illustrated as a single translator terminal 110, this is not required and the translator terminal 110 can be a group or collection of translator terminals 110 operating independent of each other to input or edit via a group of translator user profiles through the web browsers of the translator terminals 110 over the network 102, which may be in parallel or not in parallel, various descriptive (or unstructured) texts recited in target languages (e.g., Latvian, Greek) in the application program of the computing instance 104 post-translations thereof for saving in the application program of the computing instance 104 and subsequent availing of such descriptive (or unstructured) texts, as input or edited via the group of translator user profiles through the web browsers of the translator terminals 110 over the network 102, by the application program of the computing instance 104 to the text source terminal 108 over the network 102. Likewise, note that although the translator terminal 110 is shown as being separate and distinct from the administrator terminal 106 and the text source terminal 108, this is not required and the translator terminal 110 can be common or one with at least one of the administrator terminal 106 (e.g., for testing purposes) or the text source terminal 108 (e.g., for testing purposes).

In one mode of operation, as further explained below, the administrative terminal 106, via the administrative user profile, can browse to administer the application program of the computing instance 104 over the network 102 to enable the text source terminal 108 to input a source content (e.g., a descriptive text, an unstructured text, an article, an essay, an electronic conversation, a legal document, a patent specification, a contract) recited in a source language (e.g., Turkish) via the text source user profile into the application program of the computing instance 104 over the network 102. Then, the application program of the computing instance 104 (1) profiles the source content recited in the source language based on various NLP techniques, (2) routes the source content among translation workflows (e.g., machine translation or manual edits) to be translated from the source language to a target language (e.g., English) based on such profiling and satisfaction or non-satisfaction of corresponding thresholds to form a target content (e.g., a descriptive text, an unstructured text) recited in the target language, (3) profiles the target content recited in the target language based on various NLP techniques, and (4) performs a targeted LQA process on the target content recited in the target language by corresponding routing of the target content among translation workflows if warranted based on such profiling and satisfaction or non-satisfaction of corresponding thresholds, as further explained below. For example, profiling the source descriptive text recited in the source language or the target language may sequentially include (1) tokenizing text to segment sentences, (2) perform part of speech tagging on tokenized text, (3) applying a Sonority Sequencing Principle (SSP) to tagged tokenized text to split words into syllables, (4) determining whether such syllabized text passes or fails on a per segment level using thresholds, weights, and predictive machine learning (ML) models, and (5) determining whether files sourcing the source descriptive text recited in the source language or the target language pass or fail using thresholds, weights, and predictive ML models. This unconventional approach is technologically beneficial because various NLP techniques are used as an automated workflow decision-driving mechanism in accurately managing workflows of files (e.g., data files, text files, productivity files) on enterprise scale, including for the targeted LQA process, in contrast to a conventional approach of having various content transformation decisions being made manually by a human actor. Such technological benefits increase computational efficiency, decrease network latency, expedite speed of translations, and improve translation quality, while simultaneously being more cost-effective and less laborious than the conventional approach. For example, when content (e.g., a descriptive text, an unstructured text) is routed for machine translation even though such content is not suited for machine translation, there are significant additional post-editing manual translation efforts, which are time-consuming and laborious, while also being wasteful in computational cycles and network bandwidth. Therefore, the unconventional approach noted above minimizes or eliminates these significant additional post-editing manual translation efforts. Likewise, unlike random content selection or oversampling for the targeted LQA process, the unconventional approach noted above enables or maximizes targeted search for "real" poor quality candidates, which leads to significant reduction of time and labor for the targeted LQA process, while being efficient in computational cycles and network bandwidth.

Figure 2:
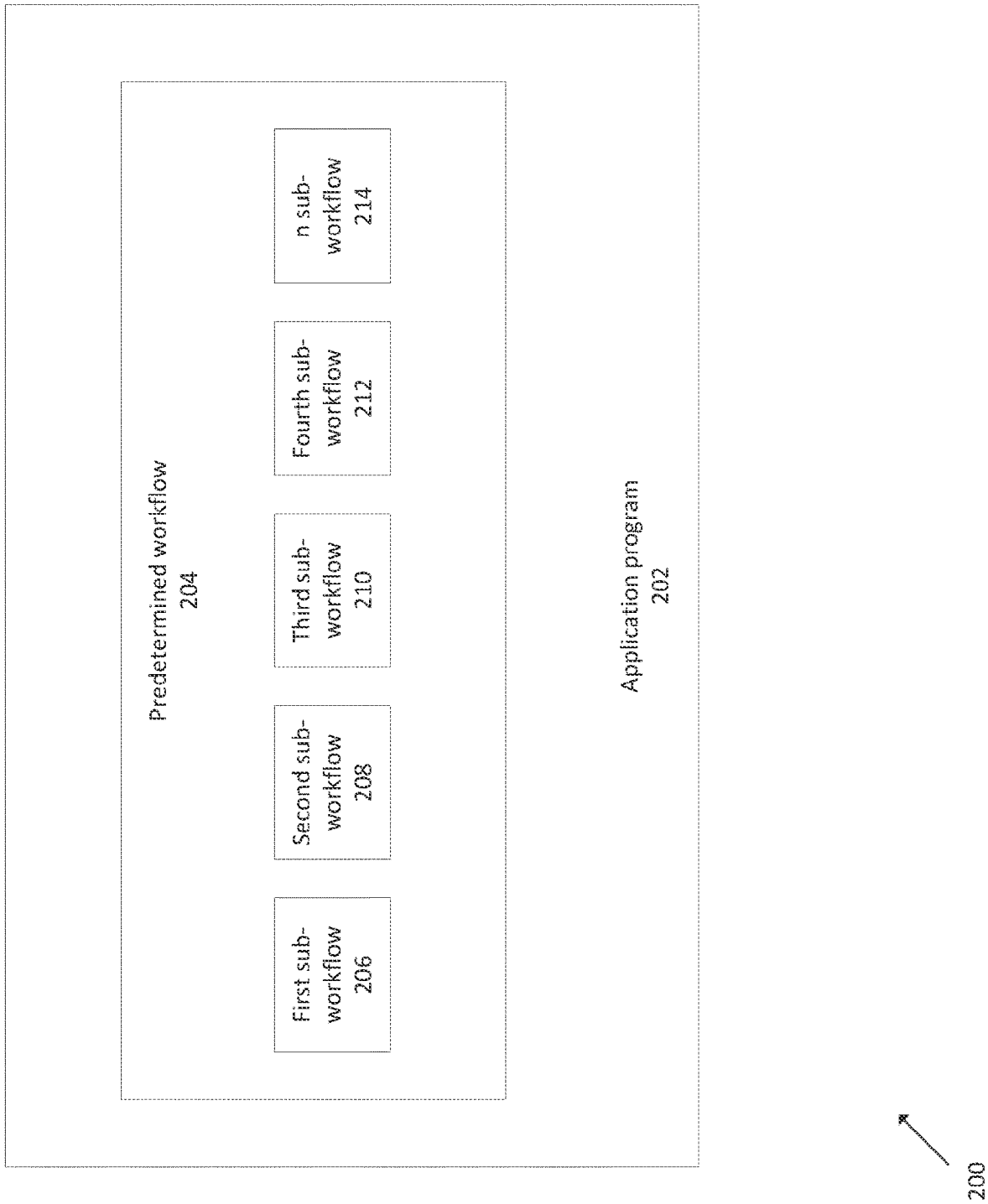
FIG. 2 shows a schematic diagram of an embodiment of an application program from FIG. 1 to linguistic content evaluations to predict performances in linguistic translation workflow processes based on natural language processing according to this disclosure.

FIG. 2 shows a schematic diagram of an embodiment of an application program from FIG. 1 to linguistic content evaluations to predict performances in linguistic translation workflow processes based on natural language processing according to this disclosure. In particular, an architecture 200 includes an application program 202 containing a predetermined workflow 204 (e.g., a task workflow) containing a first sub-workflow 206 (e.g., a task workflow), a second sub-workflow 208 (e.g., a task workflow), a third sub-workflow 210 (e.g., a task workflow), a fourth sub-workflow 212 (e.g., a task workflow), and an n sub-workflow 214 (e.g., a task workflow), some, most, many, or all may be invoked, trigged, or interfaced with via a respective application programming interface (API). The computing instance 104 hosts the architecture 200 and the application program of the computing instance 104 is the application program 202.

The application program 202 may be implemented as a recommendation engine (e.g., a task-dedicated executable logic that can be started, stopped, or paused) or another form of executable logic including an enterprise content management (ECM) or task-allocation application program having a service-oriented architecture with a process driven messaging service in an event-driven process chain or a workflow or business-rules engine (e.g., a task-dedicated executable logic that can be started, stopped, or paused) to manage (e.g., start, stop, pause, handle, monitor, transition, allocate) the predetermined workflow 204 containing the first sub-workflow 206, the second sub-workflow 208, the third sub-workflow 210, the fourth sub-workflow 212, and the n sub-workflow 214 or the first sub-workflow 206, the second sub-workflow 208, the third sub-workflow 210, the fourth sub-workflow 212, and the n sub-workflow 214, which may be via software-based workflow agents (e.g., a task-dedicated executable logic that acts for a user or other program in a relationship of agency) driving workflow steps. For example, the application program 202 may be a workflow application to automate, to at least some degree, a translation workflow process or processes via a series of computing steps, although some steps may still require some human intervention, such as an approval or custom translation input or edits. Such automation may occur via a workflow management system (WfMS) that enables a logical infrastructure for set-up, performance, and monitoring of a defined sequence of tasks to translate or enable translation. The workflow application may include a routing system (routing flow of information or document), a distribution system (transmits information to designated work positions or logical stations), a coordination system (manage conflicts or priority), and an agent system (task logic). Note that workflow may be separate or orchestrated to be separate from execution of the application program 202. For example, the application program 202 may be cloud-based to unify content, task, and talent management functions to transform content (e.g., a descriptive text, an unstructured text) securely and efficiently by integrating a content management system (CMS), a customer relationship management (CRM) system, a marketing automation platform (MAP), a product information management (PIM) software, and a translation management system (TMS). This configuration may enable pre-configured and adaptive workflows that manage content variability and ensure consistent performance across distributed project teams (e.g., managed via the translator user profiles). This enables control of workflows to manage risks while adapting to—and balancing—human work (e.g., managed via the translator user profiles) and process automation, to maximize efficiency without sacrificing quality. For example, the application program 202 may have a client portal to be accessed via the text source user profile operating the web browser of the text source terminal 108 over the network 102 to provide a private, secure gateway for visual review of translation quotes, start projects, view status, and get user questions answered.

Figure 3:
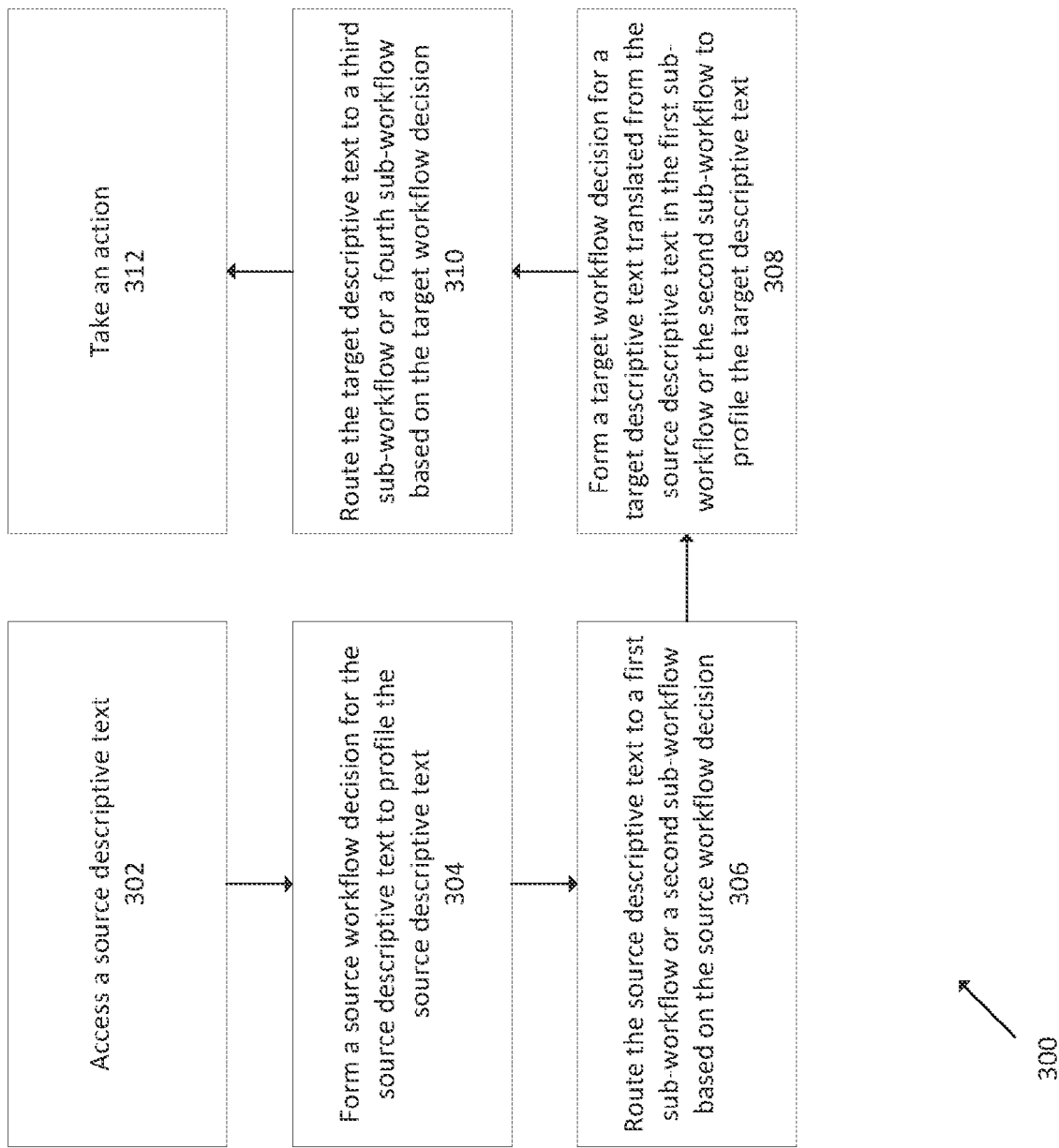
FIG. 3 shows a flowchart of an embodiment of a process to operate the application program of FIG. 2 to linguistic content evaluations to predict performances in linguistic translation workflow processes based on natural language processing according to this disclosure.

FIG. 3 shows a flowchart of an embodiment of a process to operate the application program of FIG. 2 to linguistic content evaluations to predict performances in linguistic translation workflow processes based on natural language processing according to this disclosure. In particular, a process 300 includes steps 302-312, which are performed via the computing architecture 100 and the architecture 200, as disclosed herein.

In step 302, the application program 202 accesses a source descriptive text (e.g., an article, an essay, an electronic conversation, a legal document, a patent specification, a contract) recited in a source language (e.g., Russian). This may occur by the text source terminal 108 inputting (e.g., uploading, selecting, identifying, pasting, referencing) the source descriptive text into the application program 202. The source descriptive text may include unstructured text. The application program 202 has the predetermined workflow 202 containing the first sub-workflow 206, the second sub-workflow 208, the third sub-workflow 210, the fourth sub-workflow 212, and the n sub-workflow 214. The application program 202 may (1) contain an NLP framework or model (e.g., an NLP engine from Stanford Stanza, spaCy, NLTK or custom engines) or interface with the NLP framework or model if the NLP is external to the application program 202 or (2) contain a suit of appropriate libraries (e.g., Python, regular expressions) or interface with the suitable suite of libraries if the suit of appropriate libraries is external to the application program 202.

In step 304, within the predetermined workflow 202 containing the first sub-workflow 206, the second sub-workflow 208, the third sub-workflow 210, the fourth sub-workflow 212, and the n sub-workflow 214, the application program 202 forms a source workflow decision for the source descriptive text to profile the source descriptive text based on various actions performed by the application program 202, which may invoke an API do these actions. When these actions are performed sequentially by the application program 202 as indicated below, then more precise profiling of the source descriptive text may occur.

These actions include (1) identifying the source language (e.g., Dutch, Hebrew) in the source descriptive text when the source language is not known or identified in advance or needs to be validated or confirmed even if known or identified in advance, although this action may be omitted when the source language is known or identified in advance or does not need to be validated or confirmed even if known or unknown or identified or not identified in advance. This action may be performed via running the source descriptive text against a trained NLP model for language identification, which can recognize many languages. For example, the trained NLP model may be a FastText model. If the source language is or is suspected to include at least two source languages (e.g., Arabic and Spanish) or a confirmation thereof is needed, then whatever source language that is dominant within the source descriptive text may be identified as the source language by (a) parsing the source descriptive text (or a portion thereof) into a preset number of lines (e.g., first 1000 consecutive lines contained within a fixed number of lines within a data structure or a file, or presented within a fixed display area), (b) identifying the source languages in the preset number of lines, and (c) identifying the source language from the source languages that is dominant in the preset number of lines based on a majority or minority analysis. For example, (a) the source descriptive text may be parsed into the preset number of lines (e.g., 750 consecutive lines contained within a fixed number of lines within a data structure or a file, or presented within a fixed display area), (b) Russian source language and English source language may be identified as being present in the preset number of lines, and (c) a majority or minority count is performed on the preset number of lines to determine whether Russian source language is a majority (or super-majority or greater) or minority (or super-minority or lesser) source language in the preset number of lines relative to English source language in the preset number of lines or whether English source language is a majority or minority source language in the preset number of lines relative to Russian source language in the preset number of lines. As such, if 95% (or another majority or super-majority or greater) of text within the preset number of lines recites Russian characters and 5% (or another minority or super-minority or lesser) of text within the preset number of lines recites English characters, then the source language that is dominant within the descriptive text will be identified as Russian (e.g., RU). This identifier may be subsequently used to configure, reconfigure, set, reset, activate, or reactivate other NLP or translation techniques disclosed herein.

These actions include (2) tokenizing the source descriptive text into a set of source tokens according to the source language that has been identified. For example, such tokenizing may include separating a piece of text into smaller units called tokens-words, characters, or sub-words. This action may be performed via inputting the source descriptive text into an NLP framework or model for the source language that has been identified. For example, such tokenization may be done by an NLP engine (e.g., Stanford Stanza, spaCy, NLTK). Note that if the source language is identified, but there is no ML model for the source language (e.g., a rare language), then the process 300 may stop here and the source descriptive text will not be processed further. For example, the application program 202 may contain or access a log to log an event that such locale is not supported or the application program 202 may generate a warning message. Otherwise, the process 300 proceeds further if the application program 202 contains or has access to an ML model for the source language that is identified.

The actions include (3) tagging each source token selected from the set of source tokens with a part of source speech label according to the source language that has been identified such that a set of part of source speech labels is formed. For example, such tagging may include assigning a part of speech to each given token by labelling each word in a sentence with its appropriate part of speech (e.g., nouns, verb, adverbs, adjectives, pronouns, conjunction and their sub-categories), although the token may also have one part of speech in that particular context (e.g., "file" may be a noun or verb but not both for that token). For example, such tagging may be done via a suite of libraries and programs based on grammatical rules and/or statistics or deep learning neural models (e.g., Stanford Stanza, NLTK library).

These actions include (4) segmenting each source token selected from the set of source tokens into a set of source syllables according to the source language that has been identified. For example, such segmenting may be in accordance with a SSP technique, which may aim to outline a structure of a syllable in terms of sonority. This form of segmentation enables a more accurate counting of syllables. For example, syllables may be counted based on a syllabic nucleus, typically a vowel, which denotes a sonority peak (sonority falls before and after the syllabic nucleus in a typical syllable). Therefore, more accurate counting of syllables is important for readability formulas (e.g., Flesch-Kincaid, Gunning-Fog, SMOG, RIX, LIX), which may be highly weighted features to determine pass/fail complexity of individual sentences for thresholds on a per segment basis (for the source descriptive text recited in the source language) and a per file (sourcing the source descriptive text recited in the source language) basis, as disclosed herein. Segmenting each source token selected from the set of source tokens into the set of source syllables according to the source language that has been identified may be performed by a programming package (e.g., from Python Package Index, Perl package, a group of regular expressions). If there is more than one language recited in the source descriptive text, then the programming package may be informed or configured of such state of being or there may be another programming package for another language.

The actions include determining whether the source descriptive text satisfies a source descriptive text threshold for the source language that has been identified. For example, there may be one source descriptive text threshold for one language (e.g., English) and another source descriptive text threshold for another language (e.g., Serbian). The application program 202 can perform such determination in various ways. One of such ways involves the application program 202 obtaining, receiving, reading, or otherwise accessing a set of historical data (e.g., a descriptive text, an unstructured text, configuration data, statistical data) for a particular domain, product, or subject matter (e.g., marketing documentation, technical documentation, legal documentation, contractual documentation, training documentation, product documentation) sourced from the administrator terminal 106 or the text source terminal 108. Then, the application program 202 performs, runs, receives, reads, or otherwise accesses an analysis on the set of historical data using a set of default thresholds, which may be set by the administrator terminal 106 or the translator terminal 110. The set of default thresholds has initially been formed, set, formatted, and input into the application program 202 from the administrator terminal 106 or the translator terminal 110 for each part of speech, readability, and complexity feature for each source language for which the application program 202 is programmed and each target language for which the application program 202 is programmed, based on interviews conducted with professional linguists operating the administrator terminal 106 or the translator terminal 110. Then, the application program 202 calibrates the set of default thresholds using data science and statistics techniques to form a set of calibrated thresholds. Such data science and statistics techniques may include an identification of one or two standard deviations from a mean formed, sourced or based on the analysis or the set of default thresholds to represent an outlier beyond an interquartile range (IQR) as per various calculations. These calculations may include (1) calculating the interquartile range for a set of data formed, sourced or based on the analysis or the set of default thresholds. (2) multiplying the IQR by 1.5 (an example constant used to discern outliers), (3) adding 1.5× IQR to a third quartile, where any number greater than this result is a suspected outlier, and (4) subtract 1.5×IQR from a first quartile, where any number less than this result is a suspected outlier. After the application program 202 calibrates the set of default thresholds to form the set of calibrated thresholds for each feature, the application program 202 processes a set of documents (e.g., source descriptive text) related to that particular domain, product, or subject matter using the set of calibrated thresholds. If, in a particular sentence, that particular feature is greater than a calibrated threshold from the set of calibrated thresholds, then the application program 202 flags, deems, labels, semaphores, or otherwise associates that feature to be a FAIL (e.g., lower than threshold denotes FAIL for reading ease although vice versa is possible). The application program 202 counts a weight of each such failed feature towards an overall fail of a segment (or document) since feature weights are different. Ultimately, the application program 202 aggregates each feature FAIL for a sentence up to a file level to determine whether an entire file is cumulatively as a whole is a fail (and is recommended to be rewritten or edited), review via the translator terminal 110, or pass for subsequent process, as disclosed herein.

The source descriptive text threshold may be satisfied based on a syllabized text recited in the source language (from the set of source syllables) passing the source descriptive text threshold on a per segment level using predetermined thresholds, weights, and predictive ML models; or otherwise failing. Note that syllabization is one of many linguistic features. There may be thresholds for each part of speech. For example, a threshold may be satisfied (pass) based on syllabization, but not satisfied (fail) on number of nouns, although satisfaction or non-satisfaction may be vice versa. Some examples of such features include adjectives, nouns, proper nouns, word count, long words, numbers, punctuations, or other suitable features. The source descriptive text threshold may be satisfied based on a file sourcing the source descriptive text recited in the source language and the syllabized text recited in the source language (from the set of source syllables) passing the source descriptive text threshold on a per file basis (or as a whole) using predetermined thresholds, weights, and predictive ML models; or otherwise failing. The source descriptive text may satisfy the source descriptive text threshold based on a source syntactic feature within the syllabized text recited in the source language (from the set of source syllables) or a source semantic feature within the syllabized text recited in the source language (from the set of source syllables) involving (i) the set of source tokens tagged according to the set of part of source speech labels or (ii) the set of source syllables.

The source syntactic feature or the source semantic feature may involve a part of speech rule for the source language. The source syntactic feature or the source semantic feature may involve a complexity formula for the source language. For example, the complexity formula can be generic to source languages or one source language may have one complexity formula and another source language may have another complexity formula. The source syntactic feature or the source semantic feature may involve a readability formula (e.g., Flesch-Kincaid, Gunning-Fog. SMOG, LIX, RIX) for the source language. For example, the readability formula can be generic to source languages or one source language may have one readability formula and another source language may have another readability formula. The source syntactic feature or the source semantic feature may involve a measure of similarity to a historical source descriptive text for the source language (e.g., a baseline source descriptive text). The source syntactic feature or the source semantic feature may involve the set of source syllables satisfying or not satisfying a source syllable threshold for the source language. Note that syllabization is one of many linguistic features. There may be thresholds for each part of speech. For example, a threshold may be satisfied (pass) based on syllabization, but not satisfied (fail) on number of nouns, although satisfaction or non-satisfaction may be vice versa. Some examples of such features include adjectives, nouns, proper nouns, word count, long words, numbers, punctuations, or other suitable features.

The actions include labeling (e.g., flagging, associating, referencing, pointing, semaphoring) the source descriptive text with a source pass label based on the source descriptive text threshold being satisfied or a source fail label based on the source descriptive text threshold not being satisfied. Therefore, the source workflow decision profiling the source descriptive text recited in the source language is formed based on the source descriptive text being labeled with the source pass label or the source fail label.

In step 306, the application program 202 routes the source descriptive text to the first sub-workflow responsive to the source workflow decision being formed based on the source descriptive text being labeled with the source pass label or the second sub-workflow responsive to the source workflow decision being formed based on the source descriptive text being labeled with the source fail label. This enables a potential risk mitigation in case of a potential translation quality fail.

The first sub-workflow includes a machine translation. For example, the machine translation may include a machine translation API programmed to be invoked on routing to receive the source descriptive text recited in the source language, translate the source descriptive text recited in the source language from the source language into the target language (e.g., target descriptive text), and output the source descriptive text in the target language (e.g., target descriptive text) for subsequent use (e.g., saving, presentation, copying, sending). The application program 202 may contain the machine translation API or access the machine translation API if the machine translation API is external to the application program 202.

The second sub-workflow includes a user input that translates the source descriptive text from the source language to the target language, thereby forming the target descriptive text using a machine translation or a user input translation. For example, the application program 202 may present an interface to a user (e.g., a translator) to present the source descriptive text in the source language and enable the source descriptive text to be translated from the source language to the target language via the user entering the user input (e.g., a keyboard text entry or edits) to form the target descriptive text.

In step 308, within the predetermined workflow 202 containing the first sub-workflow 206, the second sub-workflow 208, the third sub-workflow 210, the fourth sub-workflow 212, and the n sub-workflow 214, the application program 202 forms a target workflow decision for the source descriptive text that was translated from the source language that has been identified into the target descriptive text recited in the target language during the first sub-workflow or the second sub-workflow to profile the target descriptive text based on various actions performed by the application program 202, which may invoke an API do these actions, which may be the API from the step 304. When these actions are performed sequentially by the application program 202 as indicated below, then more precise profiling of the source descriptive text may occur.

These actions include (1) identifying the target language in the target descriptive text. This action may be performed via running the target descriptive text against a trained NLP model for a language identification, which can recognize many languages. For example, the trained NLP model may be a FastText model.

The actions include (2) tokenizing the target descriptive text into a set of target tokens according to the target language that has been identified. For example, such tokenizing may include separating a piece of text into smaller units called tokens-, words, characters, or sub-words. This action may be performed via inputting the target descriptive text into an NLP framework or model for the target language that has be identified. For example, such tokenization may be done by an NLP engine (e.g., Stanford Stanza, spaCy, NLTK).

The actions include (3) tagging each target token selected from the set of target tokens with a part of target speech label according to the target language that has been identified such that a set of part of target speech labels is formed. For example, such tagging may include as the process of assigning one of several parts of speech to a given token by labelling each word in a sentence with its appropriate part of speech (e.g., nouns, verb, adverbs, adjectives, pronouns, conjunction and their sub-categories). For example, such tagging may be done via a suite of libraries and programs based on grammatical rules and/or statistics or deep learning neural models for NLP (e.g., NLTK library).

The actions include (4) segmenting each target token selected from the set of target tokens into a set of target syllables according to the target language that has been identified. For example, such segmenting may be in accordance with a SSP technique, which may aim to outline a structure of a syllable in terms of sonority. This form of segmentation enables a more accurate counting of syllables. For example, syllables may be counted based on a syllabic nucleus, typically a vowel, which denotes a sonority peak (sonority falls before and after the syllabic nucleus in a typical syllable). Therefore, more accurate counting of syllables is important for readability formulas (e.g., Flesch-Kincaid, Gunning-Fog, SMOG, LIX, RIX), which may be highly weighted features to determine pass/fail complexity of individual sentences for thresholds on a per segment basis (for the target descriptive text recited in the target language) and a per file (sourcing the target descriptive text recited in the target language) basis, as disclosed herein. Segmenting each target token selected from the set of target tokens into the set of target syllables according to the target language that has been identified may be performed by a programming package (e.g., from Python Package Index, Perl package, a group of regular expressions).

The actions include determining whether the target descriptive text satisfies a target descriptive text threshold for the target language that has been identified. For example, there may be one target descriptive text threshold for one language (e.g., English) and another target descriptive text threshold for another language (e.g., Serbian).

The application program 202 can perform such determination in various ways. One of such ways involves the application program 202 obtaining, receiving, reading, or otherwise accessing a set of historical data (e.g., a descriptive text, an unstructured text, configuration data, statistical data) for a particular domain, product, or subject matter (e.g., marketing documentation, technical documentation, legal documentation, contractual documentation, training documentation, product documentation) sourced from the administrator terminal 106 or the text source terminal 108. Then, the application program 202 performs, runs, receives, reads, or otherwise accesses an analysis on the set of historical data using a set of default thresholds, which may be set by the administrator terminal 106 or the translator terminal 110. The set of default thresholds has initially been formed, set, formatted, and input into the application program 202 from the administrator terminal 106 or the translator terminal 110 for each part of speech, readability, and complexity feature for each source language for which the application program 202 is programmed and each target language for which the application program 202 is programmed, based on interviews conducted with professional linguists operating the administrator terminal 106 or the translator terminal 110. Then, the application program 202 calibrates the set of default thresholds using data science and statistics techniques to form a set of calibrated thresholds. Such data science and statistics techniques may include an identification of one or two standard deviations from a mean formed, sourced or based on the analysis or the set of default thresholds to represent an outlier beyond an IQR as per various calculations. These calculations may include (1) calculating the interquartile range for a set of data formed, sourced or based on the analysis or the set of default thresholds, (2) multiplying the IQR by 1.5 (an example constant used to discern outliers), (3) adding 1.5×IQR to a third quartile, where any number greater than this result is a suspected outlier; and (4) subtract 1.5×IQR from a first quartile, where any number less than this result is a suspected outlier. After the application program 202 calibrates the set of default thresholds to form the set of calibrated thresholds for each feature, the application program 202 processes a set of documents (e.g., target descriptive text) related to that particular domain, product, or subject matter using the set of calibrated thresholds. If, in a particular sentence, that particular feature is greater than a calibrated threshold from the set of calibrated thresholds, then the application program 202 flags, deems, labels, semaphores, or otherwise associates that feature to be a FAIL (e.g., lower than threshold denotes FAIL for reading ease although vice versa is possible). The application program 202 counts a weight of each such failed feature towards an overall fail of a segment (or document) since feature weights are different. Ultimately, the application program 202 aggregates each feature FAIL for a sentence up to a file level to determine whether an entire file is cumulatively as a whole is a fail (and is recommended to be retranslated), review via the translator terminal 110, or pass for subsequent process, as disclosed herein.

The target descriptive text threshold may be satisfied based on a syllabized text recited in the target language (from the set of target syllables) passing the target descriptive text threshold on a per segment level using predetermined thresholds, weights, and predictive ML models; or otherwise failing. Note that syllabization is one of many linguistic features. There may be thresholds for each part of speech. For example, a threshold may be satisfied (pass) based on syllabization, but not satisfied (fail) on number of nouns, although satisfaction or non-satisfaction may be vice versa. Some examples of such features include adjectives, nouns, proper nouns, word count, long words, numbers, punctuations, or other suitable features. The target descriptive text threshold may be satisfied based on a file sourcing the target descriptive text recited in the target language and the syllabized text recited in the target language (from the set of target syllables) passing the source descriptive text threshold on a per file basis (or as a whole) using predetermined thresholds, weights, and predictive ML models; or otherwise failing. The target descriptive text may satisfy the target descriptive text threshold based on a target syntactic feature within the syllabized text recited in the target language (from the set of target syllables) or a target semantic feature within the syllabized text recited in the target language (from the set of target syllables) involving (i) the set of target tokens tagged according to the set of part of source speech labels or (ii) the set of target syllables.

The target syntactic feature or the target semantic feature may involve a part of speech rule for the target language. The target syntactic feature or the target semantic feature may involve a complexity formula for the target language. For example, the complexity formula can be generic to target languages or one target language may have one complexity formula and another target language may have another complexity formula. The target syntactic feature or the target semantic feature may involve a readability formula (e.g., Flesch-Kincaid, Gunning-Fog, SMOG, RIX, LIX) for the target language. For example, the readability formula can be generic to target languages or one target language may have one readability formula and another target language may have another readability formula. The target syntactic feature or the target semantic feature may involve a measure of similarity to a historical target descriptive text for the target language (e.g., a baseline target descriptive text). The target syntactic feature or the target semantic feature may involve the set of target syllables satisfying or not satisfying a target syllable threshold for the target language. Note that syllabization is one of many linguistic features. There may be thresholds for each part of speech. For example, a threshold may be satisfied (pass) based on syllabization, but not satisfied (fail) on number of nouns, although satisfaction or non-satisfaction may be vice versa. Some examples of such features include adjectives, nouns, proper nouns, word count, long words, numbers, punctuations, or other suitable features.

The actions include labeling (e.g., flagging, associating, referencing, pointing, semaphoring) the target descriptive text with a target pass label based on the target descriptive text threshold being satisfied or a target fail label based on the target descriptive text threshold not being satisfied. Therefore, the target workflow decision is formed based on the target descriptive text being labeled with the target pass label or the target fail label. Note that when the step 304 and the step 308 is performed by the common API, then the common API can identically profile the source descriptive text recited in the source language and the target descriptive text recited in the target language while accounting for differences between the source language and the target language.

In step 310, the application program 202 routes the target descriptive text to the third sub-workflow responsive to the target workflow decision being formed based on the target descriptive text being labeled with the target pass label (e.g., ready for consumption) or the fourth sub-workflow responsive to the target workflow decision being formed based on the target descriptive text being labeled with the target fail label (e.g., ready for quality review). Therefore, this enables a targeted LQA if warranted in case of a potential translation quality fail based on the target fail label.

The third sub-workflow may involve a presentation of a document area (e.g., a text edit screen) presenting the target descriptive text recited in the target language for a subject matter expert review (e.g., a technologist) and validation (e.g., by activating an element of a user interface). The third sub-workflow may involve a desktop publishing action (e.g., converting the target descriptive text recited in the target language into a preset template or format) to enable the source descriptive text recited in the target language to be published or prepared for publication. The third sub-workflow may involve sending the target descriptive text recited in the target language to a user device (e.g., the text source terminal 108) external to the computing instance 104 for an end use (e.g., consumption, comprehension, review) of the target descriptive text. The third sub-workflow may include a sequence of actions that vary depending on (i) a type of a file containing the source descriptive text or the target descriptive text and (ii) an identifier for an entity submitting the source descriptive text for translation to the target descriptive text. This may enable customization based on file type or user.

The fourth sub-workflow may involve sending the target descriptive text to a user device (e.g., the translator terminal 110) external to the computing instance 104 for a linguistic user edit of the target descriptive text. The fourth sub-workflow may involve a machine-based evaluation of a linguistic quality of the target descriptive text recited in the target language according to a set of predetermined criteria to inform an end user thereof (e.g., the text source terminal 108). The fourth sub-workflow may include a sequence of actions that vary depending on (i) a type of a file containing the source descriptive text or the target descriptive text and (ii) an identifier for an entity submitting the source descriptive text for translation to the target descriptive text. This may enable customization based on file type or user.

This unconventional approach is technologically beneficial because various NLP techniques are used as an automated workflow decision-driving mechanism in accurately managing workflows of files (e.g., data files, text files, productivity files) on enterprise scale, including for the targeted LQA process, in contrast to a conventional approach of having various content transformation decisions being made manually by a human actor. Such technological benefits increase computational efficiency, decrease network latency, expedite speed of translations, and improve translation quality, while simultaneously being more cost-effective and less laborious than the conventional approach. For example, when content (e.g., a descriptive text, an unstructured text) is routed for machine translation even though such content is not suited for machine translation, there are significant additional post-editing manual translation efforts, which are time-consuming and laborious, while also being wasteful in computational cycles and network bandwidth. Therefore, the unconventional approach noted above minimizes or eliminates these significant additional post-editing manual translation efforts. Likewise, unlike random content selection or oversampling for the targeted LQA process, the unconventional approach noted above enables or maximizes targeted search for "real" poor quality candidates, which leads to significant reduction of time and labor for the targeted LQA process, while being efficient in computational cycles and network bandwidth. Additionally, this unconventional approach enables a form of visual presentation informative of performed linguistic feature analysis, a corresponding workflow recommendation, and a corresponding recommendation on the scope of the LQA process performed, especially with the ability to drill down into this visual presentation.

Figure 4:
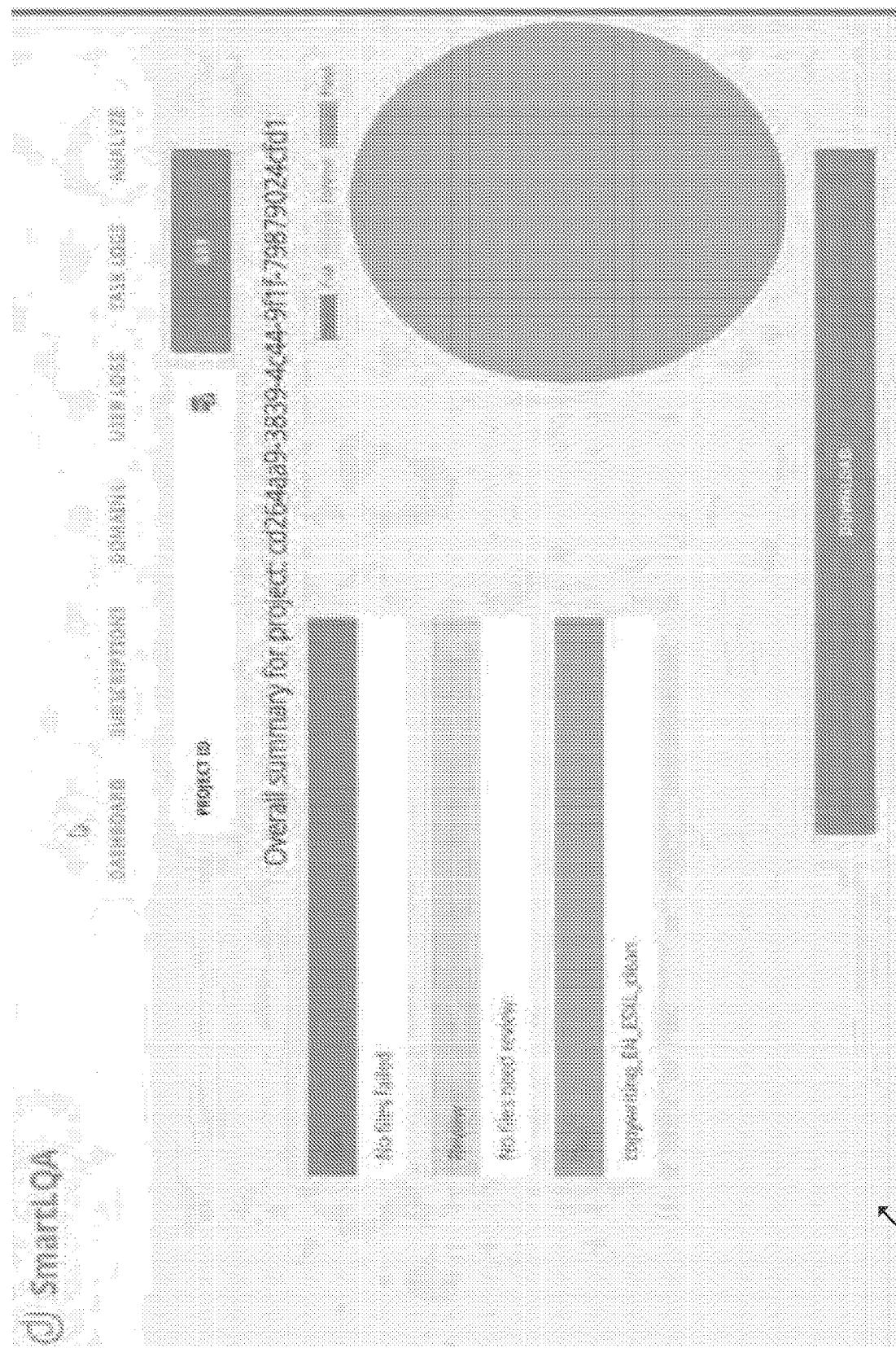
FIG. 4 shows an embodiment of a dashboard with a summary of linguistic feature analysis, workflow recommendation and recommendation on a scope of LQA according to this disclosure.

In step 312, the application program 202 takes an action based on the third sub-workflow or the fourth sub-workflow. The actions can be of various types. For example, the action may include presenting a form of visual presentation informative of performed linguistic feature analysis, a corresponding workflow recommendation, and a corresponding recommendation on the scope of the LQA process performed, as shown in FIG. 4. The form of visual presentation may have with an ability to present a drill down data into this form of visual presentation. However, note that other actions are possible.

Note that the application program 202 may contain a configuration file that is specific to a user profile associated with the text source terminal 108 and a domain (e.g., marketing documentation, technical documentation, legal documentation, contractual documentation, training documentation, product documentation) associated with the user profile. In other situations, the configuration may be stored external to the application program 202 and the application program 202 may accordingly access the configuration file. Regardless, the configuration file can include a set of parameters to be read by the application program 202 to process according or based on the configuration file. For example, the configuration file can be an executable file, a data file, a text file, a delimited file, a comma separated values file, an initialization file, or another suitable file or another suitable data structure. For example, the configuration file can include a JavaScript Object Notation (JSON) content or another file format or data interchange format that uses human-readable text to store and transmit data objects consisting of attribute-value pairs and arrays (or other serializable values). For example, the configuration file can include a set of parameters recited below on a per user profile, domain, and language basis.

```
{
  "client": "dell",
  "domain": "default",
  "languages": [
    {
      "name": "en",
      "featurelist": {
        "ADJ Count Status": [3, 0.05],
        "NOUN Count Status": [4, 0.15],
        "PROPN Count Status": [3, 0.10],
        "Long Word Count Status": [4, 0.05],
        "Complex Word Count Status": [4, 0.05],
        "Nominalization Count Status": [1, 0.05],
        "Word Count Status": [20, 0.25],
        "FleschReadingEase Status": [50, 0.3],
        "LM Score Status": [0],
        "LIX Status": [0]
      }
    },
    {
      "name": "de",
      "featurelist": {
        "ADJ Count Status": [3, 0.1],
        "NOUN Count Status": [4, 0.2],
        "PROPN Count Status": [3, 0.1],
        "Long Word Count Status": [4, 0.05],
        "Complex Word Count Status": [0],
        "Nominalization Count Status": [0],
        "Word Count Status": [20, 0.25],
        "FleschReadingEase Status": [0],
        "LM Score Status": [0],
        "LIX Status": [50, 0.3]
      }
    },
    {
      "name": "es",
      "featurelist": {
        "ADJ Count Status": [3, 0.1],
        "NOUN Count Status": [4, 0.2],
        "PROPN Count Status": [3, 0.1],
        "Long Word Count Status": [4, 0.05],
        "Complex Word Count Status": [0],
        "Nominalization Count Status": [0],
        "Word Count Status": [20, 0.25],
        "FleschReadingEase Status": [0],
        "LM Score Status": [0],
        "LIX Status": [50, 0.3]
      }
    },
    {
      "name": "fr",
      "featurelist": {
        "ADJ Count Status": [3, 0.1],
        "NOUN Count Status": [4, 0.2],
        "PROPN Count Status": [3, 0.1],
        "Long Word Count Status": [4, 0.05],
        "Complex Word Count Status": [0],
        "Nominalization Count Status": [0],
        "Word Count Status": [20, 0.25],
        "FleschReadingEase Status": [0],
        "LM Score Status": [0],
        "LIX Status": [50, 0.3]
      }
    },
    {
      "name": "ja",
      "featurelist": {
        "ADJ Count Status": [3, 0.10],
        "NOUN Count Status": [4, 0.2],
        "PROPN Count Status": [3, 0.1],
        "Long Word Count Status": [0],
        "Complex Word Count Status": [0],
        "Nominalization Count Status": [0],
        "Word Count Status": [45, 0.4],
        "FleschReadingEase Status": [0],
        "LM Score Status": [0],
        "LIX Status": [0]
      }
    },
    {
      "name": "pt",
      "featurelist": {
        "ADJ Count Status": [3, 0.1],
        "NOUN Count Status": [4, 0.2],
        "PROPN Count Status": [3, 0.1],
        "Long Word Count Status": [4, 0.05],
        "Complex Word Count Status": [0],
        "Nominalization Count Status": [0],
        "Word Count Status": [20, 0.25],
        "FleschReadingEase Status": [0],
        "LM Score Status": [0],
        "LIX Status": [50, 0.3]
      }
    },
    {
      "name": "cn",
      "featurelist": {
        "ADJ Count Status": [3, 0.1],
        "NOUN Count Status": [4, 0.2],
        "PROPN Count Status": [3, 0.1],
        "Long Word Count Status": [0],
        "Complex Word Count Status": [0],
        "Nominalization Count Status": [0],
        "Word Count Status": [39, 0.4],
        "FleschReadingEase Status": [0],
        "LM Score Status": [0],
        "LIX Status": [0]
      }
    },
    {
      "name": "xx",
      "featurelist": {
        "ADJ Count Status": [4],
        "NOUN Count Status": [4],
        "PROPN Count Status": [4],
        "Long Word Count Status": [4],
        "Complex Word Count Status": [0],
        "Nominalization Count Status": [0],
        "Word Count Status": [25],
        "FleschReadingEase Status": [0],
        "LM Score Status": [0],
        "LIX Status": [50]
      }
    }
  ]
}
```

The configuration file may contain parameters for salient features and weights on a per language basis to be used in processing of the source or target descriptive text by the application program 202, as disclosed herein. The parameters for salient features and weights differ on a per language basis and are permissioned to be customizable by the user profile. For example, various thresholds, as disclosed herein, may or may not be satisfied against the configuration file, which may function as a customizable threshold baseline. Accordingly, as shown in FIG. 6, the application program 202 determines salient features on a sentence pass/fail level for the source or target descriptive text, as disclosed herein. In addition, at the source or target descriptive text level (e.g., a file level), if more than 40% of individual salient features fail (or other lower or higher set threshold) at the source or target descriptive text level, then the source or target descriptive text may be considered (e.g., labeled, flagged, semaphored, identified) high complexity by the application program 202; if between 15-39% of individual salient features fail at the source or target descriptive text level, then the source or target descriptive text is considered (e.g., labeled, flagged, semaphored, identified) medium complexity by the application program 202; and below 15% of individual salient features fail at the source or target descriptive text level, then the source or target descriptive text is considered (e.g., labeled, flagged, semaphored, identified) low complexity by the application program 202. Resultantly, when there is a heatmap for each language used in processing or preparing the source or target descriptive text, as disclosed herein, then such heatmap may be based on the salient features and thresholds for that particular language, domain and client and will differ for English versus Russian versus French (or other source or target languages). The heatmap may be based on a set of data populated in a table shown in FIG. 6 based on the application program 202 processing the source or target descriptive text, as disclosed herein.

FIG. 4 shows an embodiment of a dashboard with a summary of linguistic feature analysis, workflow recommendation and recommendation on a scope of LQA according to this disclosure. In particular, the application program 202 presents a dashboard 400 on the text source terminal 108 via the text source user profile through the web browser of the text source terminal 108 over the network 102. The dashboard 500 shows a unique identifier associated with the source descriptive text recited in the source language and the target descriptive text recited in the target language. This allows for job tracking and corresponding workflow management. The dashboard 500 shows a color-coded diagram (e.g., implying a confidence rating by color) for the target descriptive text recited in the target language as to whether the target descriptive text recited in the target language satisfied desired LQA thresholds to be consumed by an end user (e.g., the text source terminal 108 via the text source user profile through the web browser of the text source terminal 108 over the network 102). If so (e.g., green color), then the end user may download a file (e.g., a productivity suite file, a word processing software file) containing the target descriptive text recited in the target language. However, if not (e.g., yellow color or red color), then end user may have an option (e.g., by activating an element of an API endpoint) to route the target descriptive text recited in the target language for further LQA (e.g., the translator terminal 110) or download the target descriptive text recited in the target language as is.

FIG. 5 shows an embodiment of a screen for drill-down data of the dashboard of FIG. 4 according to this disclosure. In particular, based on the process 300, the application program 202 prepares a set of drilldown data according to which the dashboard 400 is color-coded and enables the dashboard 400 to present (e.g., internally or externally) a table 500. The table 500 is populated with the set of drilldown data based on which the dashboard 400 is color-coded so that the end user (e.g., the text source terminal 108 via the text source user profile through the web browser of the text source terminal 108 over the network 102) can understand why the dashboard 400 is color-coded as is. Therefore, FIG. 4 and FIG. 5 enable the end user to visualize the dashboard 400 with a summary of linguistic feature analysis, workflow recommendation (e.g., use or no use of machine translation) and recommendation on scope of LQA, with an ability to be further drilled into for individual file or segment level.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

This disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In various embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer soft-ware, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Although various embodiments have been depicted and described in detail herein, skilled artisans know that various modifications, additions, substitutions and the like can be made without departing from this disclosure. As such, these modifications, additions, substitutions and the like are considered to be within this disclosure.

The invention claimed is:

1. A system, comprising:
a computing instance programmed to:
  access a source descriptive text recited in a source language;
  within a predetermined workflow containing a first sub-workflow, a second sub-workflow, a third sub-workflow, and a fourth sub-workflow:
    form a source workflow decision for the source descriptive text to profile the source descriptive text based on:
      identifying the source language in the source descriptive text;
      tokenizing the source descriptive text into a set of source tokens according to the source language that has been identified;
      tagging each source token selected from the set of source tokens with a part of source speech label according to the source language that has been identified such that a set of part of source speech labels is formed;
      segmenting each source token selected from the set of source tokens into a set of source syllables according to the source language that has been identified;
      determining whether the source descriptive text satisfies a source descriptive text threshold for the source language that has been identified, wherein the source descriptive text satisfies the source descriptive text threshold based on a source syntactic feature or a source semantic feature involving (i) the set of source tokens tagged according to the set of part of source speech labels or (ii) the set of source syllables;

labeling the source descriptive text with a source pass label based on the source descriptive text threshold being satisfied or a source fail label based on the source descriptive text threshold not being satisfied, wherein the source workflow decision is formed based on the source descriptive text being labeled with the source pass label or the source fail label;

route the source descriptive text to the first sub-workflow responsive to the source workflow decision being formed based on the source descriptive text being labeled with the source pass label or the second sub-workflow responsive to the source workflow decision being formed based on the source descriptive text being labeled with the source fail label;

form a target workflow decision for the source descriptive text that was translated from the source language that has been identified into a target descriptive text recited in a target language during the first sub-workflow or the second sub-workflow to profile the target descriptive text based on:

identifying the target language in the target descriptive text;

tokenizing the target descriptive text into a set of target tokens according to the target language that has been identified;

tagging each target token selected from the set of target tokens with a part of target speech label according to the target language that has been identified such that a set of part of target speech labels is formed;

segmenting each target token selected from the set of target tokens into a set of target syllables according to the target language that has been identified;

determining whether the target descriptive text satisfies a target descriptive text threshold for the target language that has been identified, wherein the target descriptive text satisfies the target descriptive text threshold based on a target syntactic feature or a target semantic feature involving (i) the set of target tokens tagged according to the set of part of target speech labels or (ii) the set of target syllables;

labeling the target descriptive text with a target pass label based on the target descriptive text threshold being satisfied or a target fail label based on the target descriptive text threshold not being satisfied, wherein the target workflow decision is formed based on the target descriptive text being labeled with the target pass label or the target fail label; and route the target descriptive text to the third sub-workflow responsive to the target workflow decision being formed based on the target descriptive text being labeled with the target pass label or the fourth sub-workflow responsive to the target workflow decision being formed based on the target descriptive text being labeled with the target fail label.

2. The system of claim 1, wherein the source syntactic feature or the source semantic feature involves a part of speech rule for the source language.

3. The system of claim 1, wherein the source syntactic feature or the source semantic feature involves a complexity formula for the source language.

4. The system of claim 1, wherein the source syntactic feature or the source semantic feature involves a readability formula for the source language.

5. The system of claim 1, wherein the source syntactic feature or the source semantic feature involves a measure of similarity to a historical source descriptive text for the source language.

6. The system of claim 1, wherein the source syntactic feature or the source semantic feature involves the set of source syllables satisfying or not satisfying a source syllable threshold for the source language.

7. The system of claim 1, wherein the first sub-workflow includes a machine translation of the source descriptive text recited in the source language from the source language to the target language.

8. The system of claim 1, wherein the second sub-workflow includes an editing workflow that enables a user edit to the source descriptive text to translate the source descriptive text recited in the source language from the source language to the target language.

9. The system of claim 1, wherein the second sub-workflow includes a user input that translates the source descriptive text from the source language to the target language thereby forming the target descriptive text using a machine translation or a user input translation.

10. The system of claim 1, wherein the source workflow decision is further based on identifying a dominant language in the source descriptive text before the source descriptive text is tokenized into the set of source tokens.

11. The system of claim 1, wherein the target syntactic feature or the target semantic feature involves a part of speech rule for the target language.

12. The system of claim 1, wherein the target syntactic feature or the target semantic feature involves a complexity formula for the target language.

13. The system of claim 1, wherein the target syntactic feature or the target semantic feature involves a readability formula for the target language.

14. The system of claim 1, wherein the target syntactic feature or the target semantic feature involves a measure of similarity to a historical target descriptive text for the target language.

15. The system of claim 1, wherein the target syntactic feature or the target semantic feature involves the set of target syllables satisfying or not satisfying a target syllable threshold for the target language.

16. The system of claim 1, wherein the third sub-workflow involves a presentation of a document area presenting the target descriptive text for a subject matter expert review.

17. The system of claim 1, wherein the third sub-workflow involves a desktop publishing action.

18. The system of claim 1, wherein the third sub-workflow involves sending the target descriptive text to a user device external to the computing instance for an end use of the target descriptive text.

19. The system of claim 1, wherein the fourth sub-workflow involves sending the target descriptive text to a user device external to the computing instance for a linguistic user edit of the target descriptive text.

20. The system of claim 1, wherein the fourth sub-workflow involves a machine-based evaluation of a linguistic quality of the target descriptive text according to a set of predetermined criteria.

21. The system of claim 1, wherein the third sub-workflow or the fourth sub-workflow include a sequence of actions that vary depending on (i) a type of a file containing the source descriptive text or the target descriptive text and (ii) an identifier for an entity submitting the source descriptive text for translation to the target descriptive text.

22. The system of claim 1, wherein the computing instance programmed to present a dashboard that depicts a color-coded diagram implying a color-based confidence level for the target descriptive text being properly translated from the source descriptive text.

23. The system of claim 22, wherein the dashboard enables a presentation of a table populated with a set of drilldown data based on which the dashboard is color-coded.

24. The system of claim 1, wherein each of the source descriptive text recited in the source language and the target descriptive text recited in the target language is profiled via a common application programming interface (API).

25. The system of claim 23, wherein the common API identically profiles the source descriptive text recited in the source language and the target descriptive text recited in the target language while accounting for differences between the source language and the target language.

26. The system of claim 1, wherein the source language includes at least two source languages recited in the source descriptive text, wherein the source language is identified in the source descriptive text based on dominance from the at least two source languages via a majority or minority analysis of the at least two source languages within a preset number of lines selected in the source descriptive text before identifying the source language.

* * * * *